US007477899B2

(12) United States Patent
Vasudevan

(10) Patent No.: US 7,477,899 B2
(45) Date of Patent: Jan. 13, 2009

(54) INTEGRATING RATE OR POWER CONTROL WITH SCHEDULING OF REVERSE LINK WIRELESS TRANSMISSIONS IN A HANDOFF ZONE

(75) Inventor: Subramanian Vasudevan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 85 days.

(21) Appl. No.: 11/040,368

(22) Filed: Jan. 21, 2005

(65) Prior Publication Data

US 2006/0166673 A1    Jul. 27, 2006

(51) Int. Cl.
*H04Q 7/20* (2006.01)
(52) U.S. Cl. ...................... 455/439; 455/522
(58) Field of Classification Search ............... 455/436, 455/437, 438, 440, 442, 443, 517, 524, 525, 455/550.1, 561, 562.1, 439, 522; 370/328, 370/331, 338, 431
See application file for complete search history.

(56) References Cited

U.S. PATENT DOCUMENTS

| 2005/0030964 A1* | 2/2005 | Tiedemann et al. ......... 370/328 |
| 2005/0041618 A1* | 2/2005 | Wei et al. .................... 370/328 |
| 2006/0057978 A1* | 3/2006 | Love et al. .................... 455/69 |

OTHER PUBLICATIONS

"Introduction to cdma2000 Spread Spectrum Systems", by 3rd Generation Partnership Project 2 "3GPP2", 3GPP2 C. S001-D, Version 1.0, Feb. 2009.

"Resource Management in Power-Controlled Cellular Wireless Systems", by Mingbo Xiao, Ness B. Shroff and Edwin K. P. Chong, School of Electrical and Computer Engineering, Wireless Communications and Mobile Computing 2001; 1:185-199 (DOI: 10.1002/wcm.6).

(Continued)

*Primary Examiner*—Sam Bhattacharya

(57) ABSTRACT

The present invention provides a method and an apparatus for controlling a wireless transmission in a handoff zone. The method includes receiving a schedule grant selectively from a first base station sector of a multiplicity of base station sectors in an active set of a mobile station and receiving a rate control command concurrently at the mobile station from a second base station sector of the active set that did not provide said schedule grant to determine at least one of a rate level and a power level based on a precedence given to the schedule grant over the rate control command. Using a combining rule depending upon a particular case, the mobile station may resolve a rate or a power level for a protocol in a digital cellular network of a mobile communication system. For a first case, a first combining rule combines one or more rate control commands with one or more schedule grants for a common rate control protocol, adding a grant precedence parameter, i.e., a schedule grant from a non-serving base station sector has precedence over rate control commands from the sectors that did not send schedule grants in the active set of a mobile station. For a second case, a second combining rule combines more than one rate control commands with more than one schedule grants for a dedicated rate control protocol by selectively setting a parameter at a value for a protocol, a rate control command from a non-serving base station sector overrides a schedule grant from a serving base station sector. This may allow the non-serving base station sectors to control a level of load from multiple users.

30 Claims, 6 Drawing Sheets

OTHER PUBLICATIONS

"On the Reverse Link Capacity of cdma2000 High Rate Packet Data Systems", by Eduardo Esteves, Qualcomm Inc. Published ICC 2002.

"Simple Inter-Cell Coordination Schemes for a High Speed CDMA Packet Downlink", by Laurence Mailaender, Howard Huang, and Harish Viswanathan, Bell Labs, Lucent Technologies. Published VTC, 2000.

"An Integrated Approach for Performance Modeling and Evaluation of Soft Handoff in CDMA Mobile Cellular Systems", by Atsushi Nagate, Masayuki and Hideo Miyahara of Department of Infomatics and Mathematical Science, Graduate School of Engineering, Osaka University and Masashi Sugano of Osaka Prefecture College of Health Sciences. Published VTC, 2000.

"The Effect of Three-Way Soft Handoff for Integrated Evaluation in CDMA Mobile Cellular Systems", by Atsushi Nagate, Masashi Sugano, Masayuki Murata and Hideo Miyahara, Department of Infomatics and Mathematical Science, Graduate School of Engineering, Osaka University. Published APCC, 2000.

* cited by examiner

INTEGRATING RATE OR POWER CONTROL WITH SCHEDULING OF REVERSE LINK WIRELESS TRANSMISSIONS IN A HANDOFF ZONE

BACKGROUND OF THE INVENTION

1. Field of the Invention

This invention relates generally to telecommunications, and more particularly, to wireless communications.

2. Description of the Related Art

In CDMA2000 standard Revision D, users of a plurality of wireless devices, such as a mobile station, either makes data transmissions on a reverse link autonomously, or based on schedule grants/rate control directives from a plurality of base station sectors. A schedule grant is a explicit communication to the mobile station from a base station indicating that it may transmit data up to a certain rate control command is a three-valued symbol (+1, 0 (no transmission),−1) that indicates to a single mobile or a group of mobiles that it may increase, shall hold or shall decrease its transmission rate by a known value he former type of rate control command is termed dedicated and the latter type is termed common. Absolute rate allocations as well as changes to rate allocations are equivalently specified as maximum traffic to pilot or (T/P) allocations. The traffic to pilot ratio specifies how much power the mobile station may use for the traffic (or data) channel relative to the power with which it is transmitting the pilot.

In a Revision D system, mobile stations transmit data on a traffic channel known as the reverse packet data channel (R-PDCH). Transmissions on the R-PDCH follow a retransmission protocol based on the receipt of positive or negative acknowledgements (ACK/NACK) feedback from the receiving base station sectors. Upon receipt of a negative acknowledgment, the mobile station retransmits the data until either a positive acknowledgement is received or the limit on retransmissions is reached. Typically, three attempts to transmit the same data are allowed. The unit of data that is being attempted to be transmitted is designated an encoder packet. The same unit of data when prepared for transmission over the air by encoding and modulating the bits is designated a sub-packet. Multiple sub-packets may be derived from the same encoder packet. At the base station, the sub-packets may be used singly or in combination with each other to recover the encoder packet.

Mobiles are said to be in handoff if they are in communication with more than one base station sector. The sectors that transmit and receive to the mobile are said to be members of the active set of sectors or the mobile's active set. One of these sectors is designated the serving sector and this sector is typically responsible for ensuring that the mobiles are given fair treatment in terms of permission to transmit as well as in the assignment of rates. Only the serving sector transmits a schedule grant. However all sectors may each transmit a rate control command and these are used at the non-serving sectors to ensure that the mobile's transmissions do not cause excessive interference.

A typical rule for rate control is that the mobile raised its transmission rate only if all the active set sectors send a rate UP command to it. It lowers its rate if any of the sectors transmits a DOWN command and HOLDS its rate otherwise. Two illustrative modes of operation are now described.

In Case 1, the mobile in the handoff zone is controlled by a common rate control protocol. At each sector, a single rate control command is transmitted to control the transmission rates of all mobiles that contain the sector in the active set. The serving sector wishes to raise the transmission rate of the mobile by a substantial amount and so sends a schedule grant to the mobile specifying a rate limit substantially higher than the rate to which the mobile is currently limited. Typically, the serving sector will transfer the high rate allocation from one mobile to the other to ensure fair treatment.) If any of the other sectors in the mobile's active set send a rate DOWN or a rate HOLD command at the same time, and the typical rule stated above is used by the mobile, it will not be able to raise its transmission rate. As a result, the serving sector has lost the ability to raise the rate of the mobile. Even if the non-serving sectors each transmit an UP at the same time as the grant, the mobile may raise its rate by at most one value (UP by one rate).

In Case 2, the mobile in the handoff zone is controlled by a dedicated rate control protocol. At each sector, separate and potentially different rate control commands are transmitted to control the transmission rates of this and other mobiles that contain the sector in their active set. The serving sector wishes to raise the rate of the mobile's transmission by sending a schedule grant. The same problems in Case 1 occur if the typical rule above is used by the mobile to determine its transmission rate. Further, the non-serving sectors must continuously transmit UP to each mobile to allow the mobile to raise its rate, whether a schedule grant or a rate control command is used at the serving sector to raise the mobile's transmission rate. If the non-serving sector stays silent, the mobile will be forced to HOLD its rate according to the typical voting rule specified above.

The present invention is directed to overcoming, or at least reducing, the effects of, one or more of the problems set forth above.

SUMMARY OF THE INVENTION

In one embodiment of the present invention, a method is provided for controlling a wireless transmission in a handoff zone. The method includes receiving a schedule grant selectively from a first base station sector of a multiplicity of base station sectors in an active set of a mobile station and receiving a rate control command concurrently at the mobile station from a second base station sector of the active set that did not provide said schedule grant to determine at least one of a rate level and a power level based on a precedence given to the schedule grant over the rate control command.

In another embodiment, a mobile station comprises a processor and a memory coupled to the processor. The memory may store instructions to control a wireless transmission in a handoff zone based on a schedule grant received selectively from a first base station sector of a multiplicity of base station sectors in an active set of the mobile station and a rate control command received concurrently at the mobile station from a second base station sector of the active set that did not provide the schedule grant to determine at least one of a rate level and a power level based on a precedence given to the schedule grant over the rate control command.

In yet another embodiment, a base station comprises a multiplicity of base station sectors, a first processor coupled to the multiplicity of base station sectors and a first memory coupled to the first processor. The first memory may store instructions to generate a schedule grant selectively from a first base station sector of the multiplicity of base station sectors in an active set of a mobile station and generate a rate control command concurrently at the mobile station from a second base station sector of the active set that did not provide the schedule grant to control a wireless transmission in a handoff zone from the mobile station based on the schedule grant and the rate control command.

In still another embodiment, a telecommunication system comprising a base station associated with a wireless network. The base station may communicate with a mobile station over a wireless medium across a multiplicity of base station sectors. The base station includes a first processor coupled to the multiplicity of base station sectors and a first memory coupled to the first processor. The first memory may store instructions to generate a schedule grant selectively from a first base station sector of the multiplicity of base station sectors in an active set of a mobile station and generate a rate control command concurrently at the mobile station from a second base station sector of the active set that did not provide the schedule grant to control a wireless transmission in a handoff zone from the mobile station based on the schedule grant and the rate control command.

In a further embodiment, an apparatus for controlling a wireless transmission in a handoff zone comprises means for receiving a schedule grant selectively from a first base station sector of a multiplicity of base station sectors in an active set of a mobile station and means for receiving a rate control command concurrently at the mobile station from a second base station sector of the active set that did not provide the schedule grant to determine at least one of a rate level and a power level based on a precedence given to the schedule grant over the rate control command.

In one illustrative embodiment, an article comprising a computer readable storage medium storing instructions that, when executed cause a processor-based system to receive a schedule grant selectively from a first base station sector of a multiplicity of base station sectors in an active set of a mobile station and receive a rate control command concurrently at the mobile station from a second base station sector of the active set that did not provide the schedule grant to determine at least one of a rate level and a power level based on a precedence given to the schedule grant over the rate control command to control a wireless transmission in a handoff zone.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method for controlling a wireless transmission in a handoff zone uses a combining rule that determines how a wireless transceiver device, such as a mobile to act upon one or more schedule grants and one or more rate control commands that it may receive concurrently from a multiplicity of sectors being in an active set of the mobile. Using a combining rule depending upon a particular case, the mobile may resolve a rate or a power level for a protocol in a digital cellular network of a mobile communication system. For Case 1, a first combining rule combines one or more rate control commands with one or more schedule grants for a common rate control protocol, adding a GRANT_PRECE-DENCE parameter. When the GRANT_PRECEDENCE=1, i.e., a schedule grant from a non-serving base station sector has precedence over rate control commands from the sectors that did not send schedule grants in the active set of a mobile station. Hence, the non-serving base station sector has the ability to ensure a fair treatment of the mobile stations in a soft handoff zone. A second combining rule in Case 2 modifies the first combining rate or power control rule of Case 1 by combining more than one rate control commands with more than one schedule grants for a dedicated rate control protocol. In Case 2, since the non-serving sectors have the ability to control the mobile's transmissions individually, the rate control commands from these sectors may override a schedule grant sent from a serving base station sector. This may allow the non-serving base station sectors to control a level of load from multiple users. Hence, a mechanism sets a GRANT_PRECE-DENCE=0 by changing the first combining rule of Case 1 so that the non-serving sector's UP rate indication does not limit the value by which a schedule grant from the serving sector can raise a mobile's rate. In this manner, the non-serving sectors may not continuously transmit energy (as an UP rate indication) to the mobile in order to allow it to raise its rate.

Figure 1:
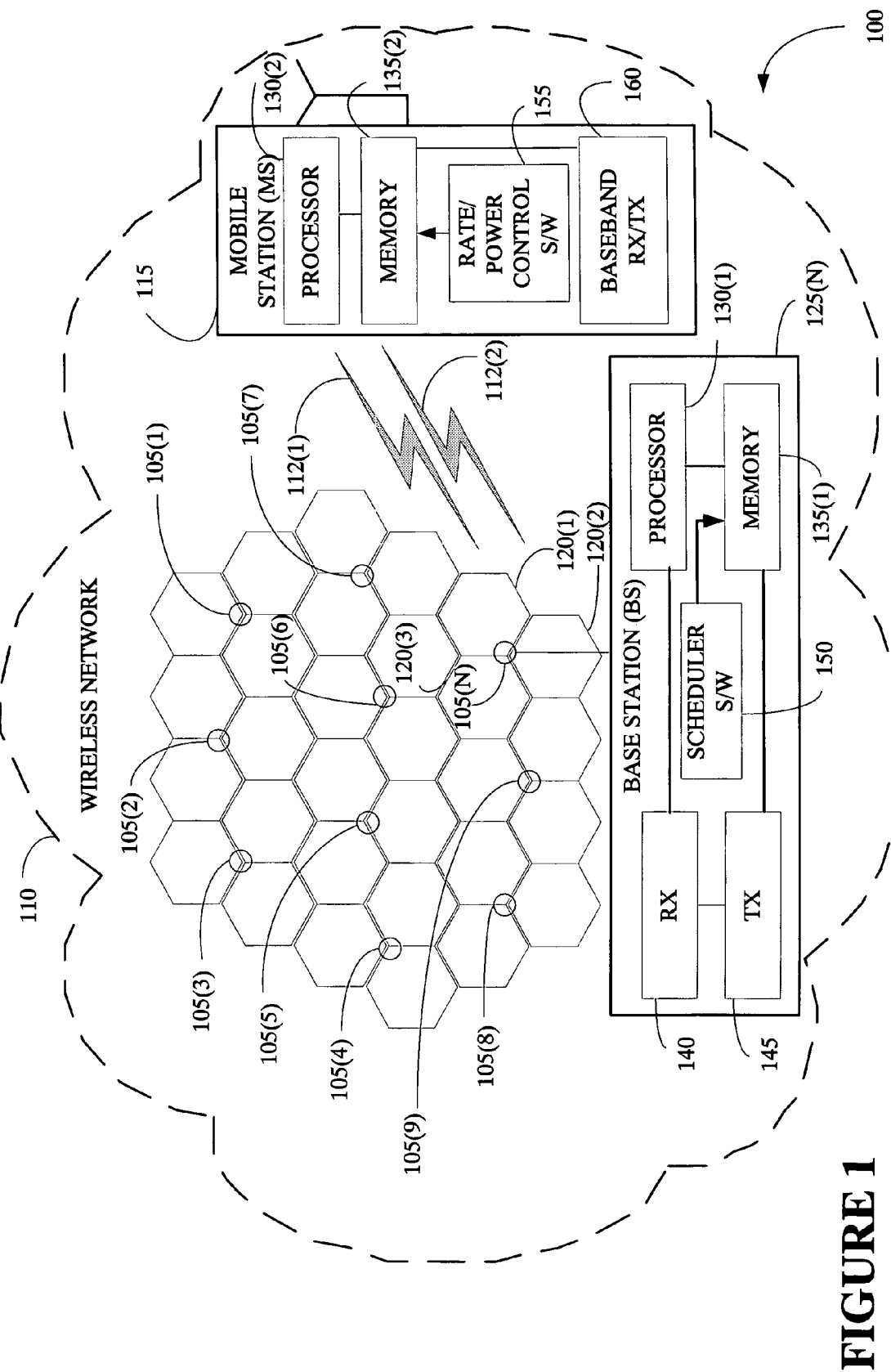
FIG. 1 illustrates a telecommunication system including a wireless network comprising a plurality of cells, each having a base station to communicate with a mobile station to control a wireless transmission in a handoff zone according to one illustrative embodiment of the present invention.

Referring to FIG. 1, a telecommunication system 100 includes geographically distributed cells 105(1-N) within a wireless network 110 capable of wirelessly communicating over a wireless medium using a forward link 112(1) and a reverse link 112(2) with a mobile station 115 according to one embodiment of the present invention. Each cell 105 may comprise one or more base station sectors where sectors may behave independently. In the CDMA2000 standard compliant wireless communication system, a typical cell may comprise three hexagonal base station sectors. For example, the cell 105(N) may comprise a multiplicity of base station sectors 120(1-3).

Each cell of the cells 105(1-N) may include a base station from a plurality of base stations 125(1-N) to enable wireless communications with the mobile station 115. Both the mobile station 115 and the base station 125(N), in one embodiment, may be defined at least in part by a code division multiple access (CDMA) protocol.

The base station 125(N) may comprise a first processor 130(1) coupled to a first memory 135(1), a receiver 140 and a transmitter 145. The first memory 135(1) may store a scheduler software (S/W) module 150 to determine at least one of an appropriate schedule grant for the one or more scheduled grants and/or an appropriate rate control command for the one or more rate control commands that need to be sent to the mobile station 115 based on the data that the mobile station 115 needs to send through the wireless network 110. Both the schedule grants and the rate control commands may be sent by the multiplicity of base station sectors 120(1-3) to the mobile station 115. However, because a schedule grant may be determined only at the non-serving sector while rate control commands may be determined at all sectors except that did not provide the schedule grant, therefore, it is not necessary that both a schedule grant and a rate control command may be determined by the scheduler S/W 150 at each base station sector 120.

The scheduler software module 150 may comprise instructions to concurrently generate from the multiplicity of base station sectors 120(1-3) at least one of a scheduled grant and a rate control command when in an active set of the mobile station 115 to control a wireless transmission in a handoff zone from the mobile station 115 based on the schedule grant and the rate control command. The mobile station 115 may transmit data through a non-directional array, so that all the base station sectors in the vicinity may receive its transmission even if those base station sectors are not serving sectors. The sender's definition of an active set is a set of base station sectors that a signal from which is above an acceptable threshold at the mobile station 115.

An active set of the mobile station 115 may be a set of base station sectors that send control information to the mobile station 115 and potentially receive the transmissions from the mobile station 115. A handoff zone, such as a soft handoff zone, may be a region between multiple base station sectors where the mobile station 115 receives control information from each of the base station sectors, and in turn, the transmissions from the mobile station 115 may be received by these base station sectors. In a soft handoff technique, each base station sector 120 may maintain queues of user packets for all the base stations 125(1-N) in the neighborhood. Essentially, in the soft handoff technique radio resources are autonomously managed by the base stations 125 (1-N) without needing any interaction from a radio access network (RAN) server.

The three hexagonal base station sectors 120(1-3) may be code-located for the base station 125(N) being in the center of the three hexagon corners from that point the three hexagonal base station sectors emanate. For example, two base stations which may not be co-located and each of base station may have three hexagonal base station sectors to communicate with such that an active set of base station sectors may comprise one base station sector from each of these two base stations. So, the mobile station 115 may attempt to resolve the schedule grants and the rate control commands that come from two base station sectors that are not co-located.

In one embodiment, based on making measurements on data from the mobile station 115 at the baseband transceiver 160 while taking into account the data that the mobile station 115 need to send through the wireless network 110, the scheduler software module 150 may determine the appropriate schedule grant and the appropriate rate control commands that need to be sent to the mobile station 115. While the scheduler software module 150 may directly communicate with the mobile station 115 and vice versa, however, different schedulers may operate independently without any communication from a base station to a base station. That is, in a distributed system each scheduler may determine the rate control commands and if it is a serving base station sector, the schedule grants independently of the other base station sectors of the multiplicity of base station sectors 120(1-3).

A serving base station sector is a member of the active set and it is the sector from which the mobile station 115 receives data either on the reverse link 112(2) or sends data on the forward link 112(1). Upon receiving data from the wireless network 110, in one embodiment, the mobile station 115 selects one base station that it has the best link with and therefore it chooses to receive its data from that one sector, which becomes the serving base station sector. The mobile station 115, however, at its own initiative, may change the serving base station sector at any point so that after it makes an indication that it wants to change the serving base station sector and make the change, the data will be routed to the mobile station 115 through this new serving base station sector.

The mobile station 115 may comprise a second processor 130(2) coupled to a second memory 135(2). The second memory 135(2) may store a rate/power control software (S/W) module 155 that implements a protocol to resolve at least one of a rate level and a power level based on the one or more schedule grants and the one or more rate control commands received from the multiplicity of base station sectors 120(1-3). The mobile station 115 may further comprise a baseband transceiver (RX/TX) 160 to receive concurrently the one or more schedule grants and the one or more rate control commands from one or more base station sectors in an active set of the mobile station 115.

The rate control command may be, for example, a three-valued symbol, representing three values including a (+1 value), (0 value), or (−1 value). The schedule grant may be a group of bits that may be encoded and modulated while being protected via a cyclic redundancy check (CRC) and sent to the mobile station 115. Both the rate control command and the schedule grant may be transmitted by a base station sector 120 (1) to the mobile station 115 within a payload. Upon receiving the payload, the mobile station 115 decodes it, demodulates it, decodes it, and obtains a set of bits, indicating a rate or a power limit or range at which it may transmit.

In operation, the rate/power control software module 155 may use a combining rule that combines the one or more schedule grants and the one or more rate control commands to decide an actual rate to transmit the wireless transmission from the mobile station 115. In doing so, the scheduler software module 150 of the base station 125(N) may monitor the baseband transceiver 160 to make a measurement on data from the mobile station 115 at the baseband transceiver 160. The baseband transceiver 160 in the mobile station 115 may execute a software module, i.e., the rate/power control software module 155 generating one or more rate control bits or a rate limit specified by the scheduled grant. That is, the baseband receiver 160 essentially implements an algorithm to determine a transmission rate the mobile station 115 is actually allowed to transmit based on the schedule grant and the rate control commands.

Within the telecommunication system 100, each of the users may communicate with the infrastructure of the wireless network 110 using channels. A particular mobile station may communicate with one or more base station sectors of the multiplicity of base station sectors 120(1-3). A set of base station sectors that receive transmissions from the mobile station 115 and potentially make transmissions to it forms an active set of base station sectors. For example, the rate control commands and the schedule grants may be sent by all the members of the active set of the multiplicity of base station sectors 120(1-3). The schedule grants transmitted only from one of the active set members of the multiplicity of base station sectors 120(1-3), termed as a non-serving base station sector may be used.

Over time, however, as the mobile station 115 moves around, the identity of the non-serving base station sector may change to a different base station sector within the same active set. Using a rate control algorithm specified by the rate/power control software module 115, the mobile station 115 may resolve any rate control commands.

According to one embodiment, the rate/power control software module 155 may use a parameter to determine a transmission rate for the wireless transmission from the mobile station 115 based on precedence of the one or more schedule grants and the one or more rate control commands. By specifying the parameter that indicates a schedule grant from a non-serving base station sector to change the transmission rate, the rate/power control software module 155 may allow the mobile station 115 to override an outcome of a rate control algorithm being implemented or executed by using the processor 130(2). That is, ability may be provided to set a value for the parameter so that either a schedule grant from a non-serving base station sector has precedence or it does not.

Instead of using a rule in which the mobile station 115 determines a transmission rate by evaluating the rate control commands coming from the different base station sectors in the active set and then essentially indicates that the transmission rate go DOWN, if any of the base station sectors convey an indication to go DOWN. However, if none of the rate control commands indicate that the transmission rate go DOWN, but one of the rate control commands is HOLD, the transmission rate would HOLD, and then if all of the rate control commands were UP, the transmission rate would go UP. In this situation, however, a schedule grant from a non-serving base station sector asking to increase the transmission rate, would not take effect.

By specifying a parameter called GRANT_PRECEDENCE, the rate/power control software module 155 may allow the mobile station 115 to override the outcome of the rate control algorithm based on the combining rule that distinguishes between a serving base station sector and a non-serving base station sector. For example, if a rate control command from a non-serving base station sector that did not provide the schedule grant indicates that the mobile station 115 may transmit up to a rate of 38.4 kilobytes per second (kps) and if a schedule grant is received at the same time from a serving or non-serving base station sector indicating that the mobile station 115 may go up to 72 kps, in this case, if the schedule grant has precedence, then the mobile station 115 will transmit up to a rate of 72 kps. The GRANT_PRECEDENCE parameter allows the schedule grant and the non-serving base station sector to override a rate limit specified by the rate control commands from the serving and/or non-serving base station sectors.

Within a handoff zone, the mobile station 115 may receive the schedule grants and the rate control commands and then be able to decide a transmission rate to transmit at the mobile station 115. While the schedule grant may be selectively received from the serving and non-serving base station sectors in the active set of the mobile station 115, the rate control commands may be concurrently received from all non-serving base station sectors that did not provide the schedule grant and potentially from the serving base station sector as well. However, the schedule grant from the serving base station sector ideally has precedence over a rate control command from the serving base station sector. According to a first combining rule, the schedule grant from the non-serving base station sector not only has precedence over the rate control command from the serving base station sector, but it also has the precedence over the rate control commands from the non-serving base station sectors of the active set that did not provide the schedule grant.

That is, the first combining rule provides an ability to set a parameter value of the GRANT_PRECEDENCE parameter so that it either has precedence, which is in Case 1 or in case 2 where it doesn't. In the Case 1, for example, by adding a GRANT_PRECEDENCE parameter or using this grant precedence, the rate/power control software module 155 may determine the transmission rate for the mobile station 115 based on the schedule grants and the rate control commands. Specifically, in Case 1, the GRANT_PRECEDENCE parameter may allow the schedule grant from the non-serving base station sector to override a rate limit specified by a rate control command from a serving base station sector or a non-serving base station sector that did not provide the schedule grant. The rate/power control software module 155 may cause the mobile station 115 to selectively receive the schedule grant from a serving or a non-serving base station sector and receive the rate control command from a serving base station sector or the non-serving base station sector that did not provide the schedule grant.

Likewise, in Case 2, a second combining rule combines more than one rate control commands with more than one schedule grants for a dedicated rate control protocol by selectively setting a parameter at a value for a protocol, a rate control command from a non-serving base station sector overrides a schedule grant from a serving base station sector based on the value of the GRANT_PRECEDENCE parameter. The rate/power control software module 155 may allow the non-serving base station sectors to control a level of load from multiple users.

In Case 1, using a common rate control protocol where each base station sector in the active set sends a single rate control command down to the mobile station 115 and then the mobile station 115 acts on the single rate control command. Using the single rate control command, all the mobile stations in a particular base station sector receive the same rate control command from that particular base station sector. The mobile station 115 may handle a one control bit command from one base station sector in the active set and potentially a different one from another base station sector, which is in the active set.

In one embodiment, the schedule grants and the rate control commands may be transmitted on a specific channel on separate channels. In the case of the schedule grants, a code channel may be shared between multiple users, so at a given time, the code channel may be used to communicate a schedule grant to a particular user and at a different time the same code channel may be used to communicate a schedule grant to another user. In the case of the rate control commands, code channels may be essentially assigned to every user, for example, in Case 2. In this manner, the mobile station 115 may continuously receive the rate control commands on its own dedicated code channels. In Case 1, however, a single code channel may be directed toward all of the mobile stations and all of the mobile stations may monitor it to receive the rate control command. Regardless, in one embodiment, the single code channel or the multiple code channels may be directed from each base station sector 120, serving or non-serving.

In Case 2, using a dedicated rate control protocol, a base station sector 120 sends potentially different rate control bits to each mobile station 115 that has that base station sector in the active set. However, the rate control commands need to be sent from all members of the active set because of an excessive consumption of power at these base station sectors. If the mobile station 115 uses the same rule that we identified in Case 1, if any one of the base station sectors indicates it to go DOWN, and if none of the base station sectors goes DOWN, but one of them tells it to HOLD, the mobile station will HOLD, and if all of the base station sectors indicate to go UP, the rate to transmission from the mobile station will go UP. However, in this Case 2 eventually have to have all the non-serving base station sectors always transmitting UP to the mobile station 115 so that it can change its rate flexibly based on the rate control commands or the schedule grants from the serving base station sector. This continuous transmission of an UP rate control command costs power. Also, if the non-serving base station sectors stay silent, then the mobile station 115 will not be able to raise its rate based on a schedule grant from the serving base station sector.

Accordingly, in Case 2, the GRANT_PRECEDENCE parameter may be used differently than set forth above in Case 1. That is, the GRANT_PRECEDENCE parameter may be set to "0" so that the rate control command from the non-serving base station sectors actually override the schedule grant from the serving base station sector. In this manner, by denying the GRANT_PRECEDENCE parameter based on the schedule grant from the serving base station sector 120(1) to override the rate control command from the non-serving base station sectors, control to the non-serving base station sectors may be given. That is, otherwise, the non-serving base station sectors will not be able to bring the rate of the mobile station 115 DOWN to a level desired by the non-serving base station sectors if the GRANT_PRECEDENCE parameter is allowed to override.

Because in the common rate control protocol based Case 1, only a single bit is being sent out, the rate/power control S/W does not respond to what is appropriate for each mobile station 115, it simply responds to the sum of all the rates that the mobile stations are transmitting with. In the dedicated rate control protocol based Case 2, however, the rate/power control software module 155 responds directly to the rate at which a particular mobile station is transmitting. If the mobile station 115 is transmitting at a relatively high rate in Case 2, then the non-serving base station sector will in fact be sending a rate DOWN control command to the mobile station 115.

While in Case 1 because the non-serving base station sector does not send individual rate control bits to all the mobile stations, even though this particular rate is too high, the rate control bit coming from the base station sector may still be to HOLD or to go UP because at the same time, some of the other mobile stations have brought DOWN their rates, for example, and therefore, the sum of all the rates seen by the non-serving base station sector is not so high that it has to reduce the rates. In Case 2, however, it is not the case because each mobile station 115 receives an individual rate control command, allowing these rate control commands to take precedence over the schedule grant.

Because, in Case 2, in order for the mobile station 115 to increase its rate, the non-serving base station sectors have to transmit an UP rate control command, consuming unnecessary power, the interpretation of the rate control command from the non-serving base station sectors at the mobile station 115 is changed. Whether the non-serving base station sector transmits an UP or a HOLD rate control command, the mobile station 115 treats that as "don't care" and if the non-serving base station sector sends a DOWN rate control command, then the mobile station 115 obeys the DOWN rate control command. Therefore, in Case 2, the mobile station 115 selectively obeys the rate control command from the non-serving base station sector.

In one embodiment, the base station sectors 120(1-3), instead of the rate, may adjust the power with which the mobile station 115 may transmit since the rate or power control may be substantially equivalent because when the mobile station 115 is allowed to transmit at a higher power, the rate actually may drop to a lower rate. One embodiment of the present invention may specify that the rate control command bits for the schedule grants don't specify a rate limit per se, but specify an equivalent power limit for the transmission from the mobile station 115.

In a common rate control protocol of Case 1, for example, where a single rate control command is sent to all mobile stations from a base station sector, the protocol may provide means for transferring load (e.g., throughput, data rate, etc.) from one user in a soft handoff (SHO) zone to another user when the GRANT_PRECEDENCE parameter is set to "1." Since in a stable condition, the rate control commands from the non-serving sectors are usually 'HOLD', a soft handoff user cannot raise its rate even when the mobile station 115 receives a schedule grant from the serving base station sector, as the first combining rule for resolving rate control commands is OR-of-the DOWNS. However, when the GRANT_PRECEDENCE parameter is set to "1," the mobile station 115 may do so. Thus, the serving base station sector may be able to transfer the high data rate allocation from one soft handoff zone user to another, even when or-of-the DOWNS rate control protocol is used, such as a common rate control protocol. Hence, a means may be provided for transferring high data rate allocations between the soft handoff users even when an OR-of-the DOWNS based rate control resolution protocol may be in place.

In a dedicated rate control protocol of Case 2, for example, since the rate control commands are being targeted to each user, it may not be appropriate to transfer high data rate allocations in this manner because the rate control commands from the non-serving base station sectors to each mobile station are meaningful in themselves. With the GRANT_PRECEDENCE parameter is set to "0," the dedicated rate control protocol may provide a means for assigning a high data rate for soft handoff zone users, while allowing the non-serving base station sectors to control the levels of load from these users.

Generally, the schedule grants are being sent from the serving base station sector and rate control commands from all sectors. The serving base station sector typically has a best link to the mobile station 115. However, the serving base station sector may not have a best link from the mobile station 115. In such a scenario, a non-serving base station sector that has a relatively best link from the mobile station 115 may send a schedule grant thereto. A protocol may use grant precedence on a schedule grant from a non-serving base station sector.

In a second scenario, due to the changing dynamics on both the links to and from the mobile station 115 as well as different levels of load (e.g., a number of users requesting a service) at each base station sector, the active set of base station sectors may selectively send schedule grants to the mobile station 115. The protocol may consider the rate control commands from those base station sectors from which it did not receive a schedule grant, and then may apply grant precedence, i.e., to the schedule grant over the rate control command. If multiple base station sectors send concurrent schedule grants, a rule may resolve the multiple schedule grants and then the protocol may resolve the rate control commands with a rate deemed to have been granted by the schedule grants. The protocol resolves more than one schedule grant and more than one rate control commands. However, the rate control commands and schedule grants may be limited to a subset of the active set of the mobile station 115, for example, three base station sectors with the best links to the mobile station 115.

The mobile station 115 may resolve schedule grants from one or more base station sectors in the active set and rate control commands from the base station sectors that did not send a schedule grant. A schedule grant from a serving base station sector always has precedence over a rate control command from that sector, i.e., the GRANT_PRECEDENCE parameter only determines whether or not schedule grants override rate control commands from non-serving base station sectors. The mobile station 115 may ignore the rate control command from the serving base station sector when it receives a schedule grant from that base station sector.

Figure 2:
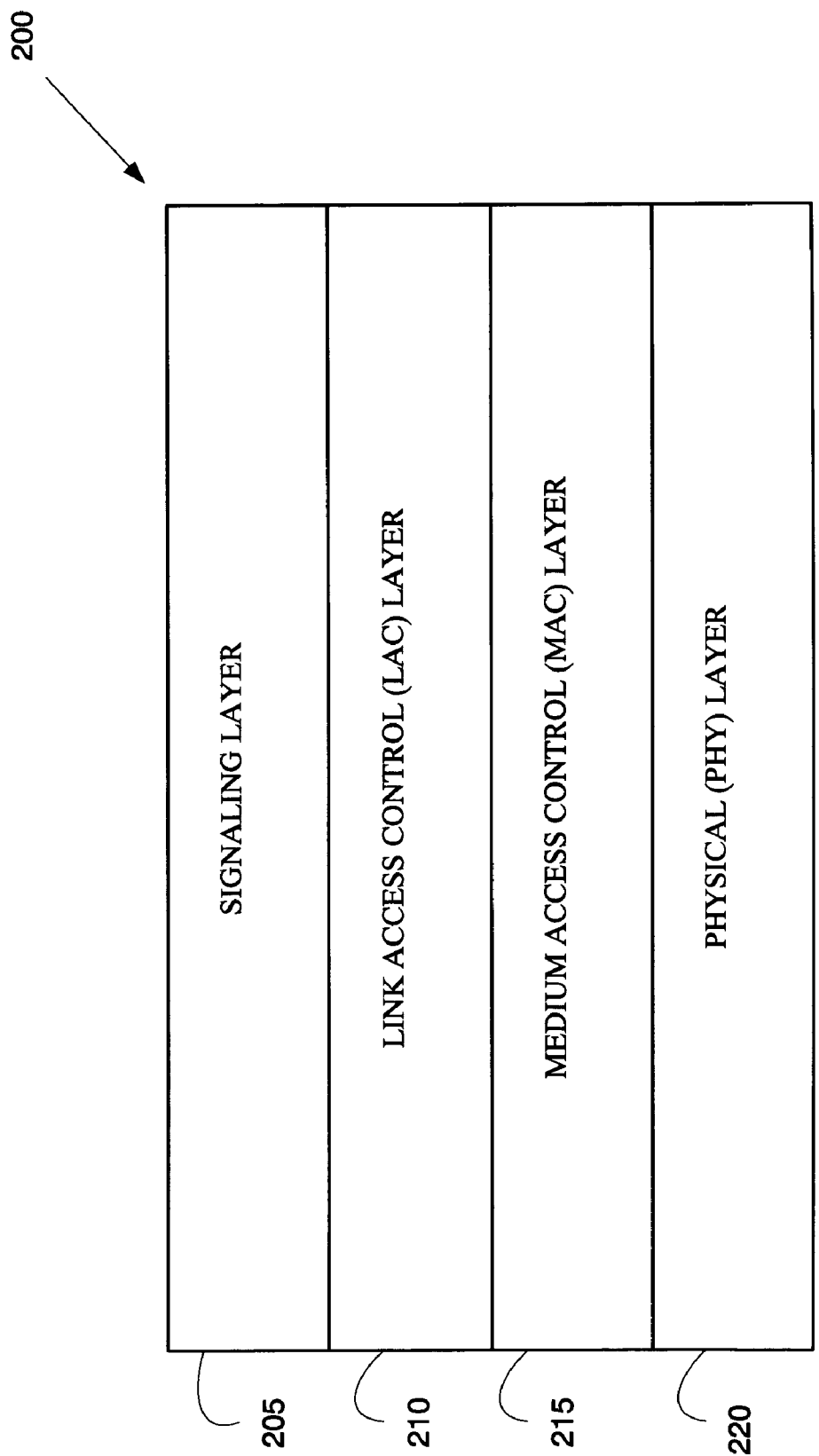
FIG. 2 illustrates a communication network protocol stack for the base station and the mobile station shown in FIG. 1 in accordance with one embodiment of the present invention.

Referring to FIG. 2, a communication network protocol stack 200 is shown for use in the mobile station 115 and the base station 125(N) according to one illustrative embodiment of the present invention. The communication network protocol stack 200 may use a protocol architecture based on the Open Systems Interconnection (OSI) reference model developed by the International Standards Organization (ISO), for example. The communication network protocol stack 200 may comprise a signaling layer 205, a link access control (LAC) layer 210, a medium access control (MAC) layer 215, and a physical (PHY) layer 220, in one embodiment. For example, the communication network protocol stack 200 may be based on the CDMA2000 standard, which uses code division multiple access (CDMA) technology to meet the requirements for third generation (3G) wireless communication systems.

The communication network protocol stack 200 may insure that the mobile station 115 can obtain service in the telecommunication system 100 shown in FIG. 1 manufactured in accordance with the CDMA2000 standard. That is, the mobile station 115 compliant with the CDMA2000 standard may be able to place and receive calls in the telecommunication system 100 using the wireless network 110 to and from the plurality of cells 105(1-N). The sequence of call processing steps that the mobile station 115 and the base station 125(N) may execute to establish calls may be specified by the communication network protocol stack 200 along with the digital control messages and, for dual mode systems, the analog signals that are exchanged between the mobile station 115 and the base station 125(N).

A four layer model, as shown in FIG. 2, may reside in the mobile station 115 and the base station sector 120(1), as well. The same bottom two layers of the mobile station 115 and the base station sector 120(1) may be used by the rate/power control software module 155. Specifically, the combining rules may involve an interaction between at least two layers, namely the PHY layer 220 and the MAC layer 215, which may be based on an OSI model consistent with the OSI standard. For example, the PHY and MAC layers 220, 215 may conform to the OSI layering in the CDMA2000 standard. Of course, the PHY layer 220 and the MAC layer 215 may be based on some other suitable model where these two layers may be appropriately defined and cooperatively interact with each other. While the PHY layer 220 decodes bits including the rate control command bits, passes them to the MAC layer 215, the MAC layer 215 implements a rule, and relays a result back to the PHY 220 layer for the mobile station 115 to transmit at an appropriate rate or a power level.

In one embodiment, the rate control commands may be exchanged between the two layers, i.e., the PHY layer 220 and the MAC layer 215, using a set of vectors being elements of a PDCH active set. The set of vectors may be provided from the PHY layer 220 to the MAC layer 215. From every base station sector 120, the PHY layer 220 may decode a rate control channel, and if it is a serving base station sector, a schedule grant, and an acknowledgment (ACK) indicator. The acknowledgement indicator is the base station's 125(N) response as to whether or not the mobile station's 115 previous transmission has been received.

The rate control algorithm in the rate/power control software module 155 may be executed when any one of the base station sectors 120(1-3) in the active set sends a positive acknowledgement (ACK) indication, such as "YES." That is, the combining rules of computing grant precedence or determining a new rate limit or a new power limit based on resolving the rate control commands from the different base station sectors 120(1-3) or the schedule grants from the serving base station sector is implemented when any one of these active base station sectors sends a positive acknowledgement in response to the mobile station's 115 previous transmissions. Thus, when the mobile station 115 becomes ready to make a new transmission the rate control algorithm in the rate/power control software module 155 goes through to the combining rules.

More specifically, the rate control algorithm may be executed if a re-transmission number for attempts to transmit equals a predefined transmission limit, or any ACK indicator is "YES." The rate control algorithm executes either when the one of the base station sectors 120(1-3) in the active set is sent a positive acknowledgement or the mobile station 115 gives up on a particular transmission because the mobile station 115 can't get this transmission through successfully because it has tried too many times. First, the rate control algorithm determines whether or not a schedule grant is present. Therefore, when the mobile station 115 becomes ready to start a new transmission, the combining rules may be used to determine the allowed power limit and the rate limit.

Figure 3:
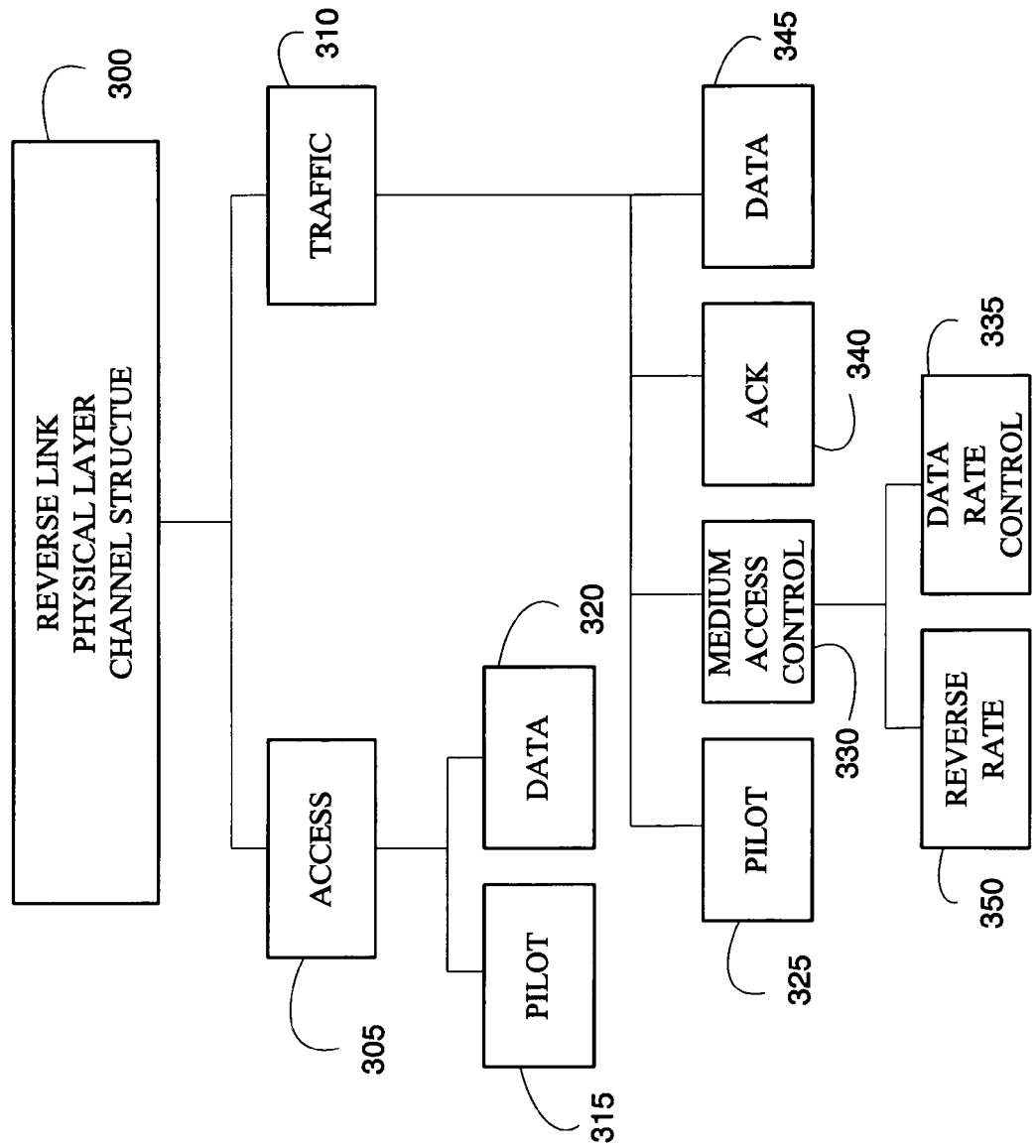
FIG. 3 illustrates a reverse link physical layer channel structure for the wireless network shown in FIG. 1 according to one embodiment of the present invention.

Referring to FIG. 3, a reverse link physical layer channel structure 300 is shown for the reverse link 112(2), as shown in FIG. 1 between the mobile station 115 and the base station 125(N). The reverse link physical layer channel structure 300 may comprise a plurality of channels including an access channel 305 and a traffic channel 310. The access channel 305 may further comprise a pilot channel 315 and a data channel 320, both being used by the mobile station 115 when in an idle state to send signaling messages via the wireless network 110. In a connected state, the mobile station 115 may transmit on the reverse traffic channel 310, which includes a pilot channel 325, a medium access control channel 330 and an acknowledgement (ACK) channel 340 and a data channel 345. The medium access control channel 330 may use a reverse rate channel 350 and a data rate control channel 335.

The data rate control channel 335 may indicate to the wireless network 110 a supportable data rate on the forward traffic channel 310 and the best serving base station sector for the forward link. The data rate control channel 335 may be a reverse packet data control channel (R-PDCCH), which may carry a corresponding encoder packet size indicator, a sub-packet identifier, a mobile station indication bit, and a transmission boost bit indicator. The acknowledgement channel 340 may inform the wireless network 110 whether a data packet transmitted on the forward traffic channel 310 from the base station 125(N) has been received successfully. The reverse rate channel 350 may indicate whether or not the data channel 345 is being transmitted on the reverse traffic channel 310 and its associated data rate. The reverse rate channel 350 may be a reverse packet data channel (R-PDCH) that may carry high speed packet data using either a single or a multi-code modulation depending on a desired data rate.

Figure 4:
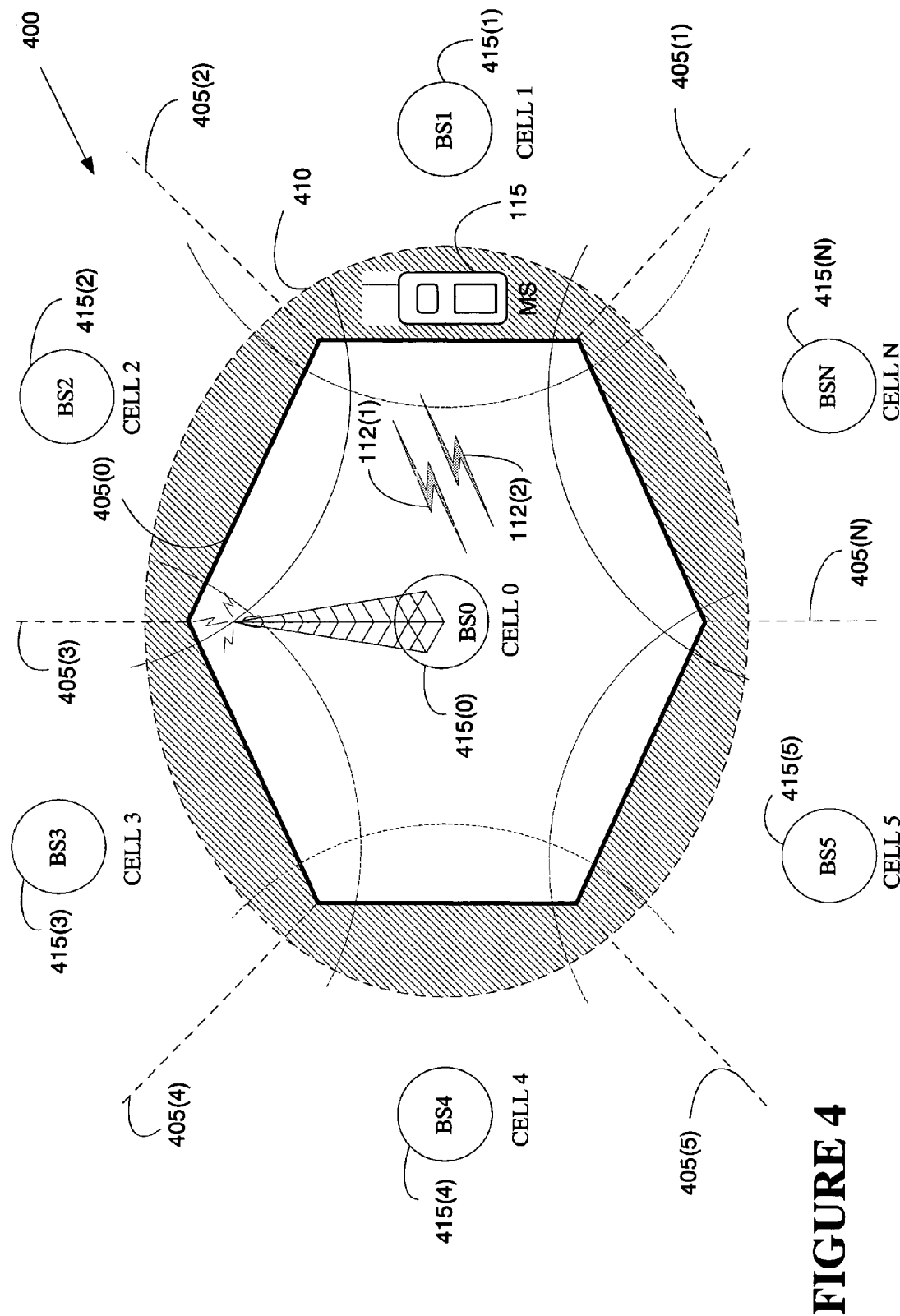
FIG. 4 illustrates a service area including a base station along with a multiplicity of base station sectors that communicate with a mobile station using a rate/power control software, which integrates rate control with scheduling for reverse link transmissions of soft handoff users consistent with one embodiment of the present invention.

Referring to FIG. 4, a service area 400 is shown being divided into a plurality of hexagonal cells 405(0-N) where the shape of each cell is approximated by a circle for simplicity, according to one embodiment of the present invention. As shown in FIG. 1, the mobile station 115 in a handoff zone 410, such as a soft handoff zone, may connect with a plurality of base stations 415(1-N). Using a single sector hexagonal cell structure, as shown in FIG. 4, in a CDMA mobile cellular station, the mobile station 115 may simultaneously connect with the plurality of base stations 415(0-N) by a soft handoff technique within the handoff zone 410. The handoff zone 410 may be a region between the cell 405(0) and the multiplicity of base station sectors of the base stations of the cells 405(1-N) where the mobile station 115 receives control information from each of the multiplicity of base station sectors, and in turn, data transmissions from the mobile station 115 may be received by the multiplicity of the base station sectors.

A combining rule based on a traffic to pilot ratio (T2P) called SECTOR_AUTHORIZED_T2P may be used for a dedicated rate control protocol based Case 2 because the traffic to pilot ratio (T2P) may be substantially equivalent to a power allowance. The traffic to pilot (T2P) ratio is the amount by which a traffic or the data channel 320 on which the mobile station 115 is making transmissions is higher than the pilot channel 315. The pilot channel 315 is the channel that the mobile station 115 transmits on to keep its link alive with the active set base station sectors 120(1-3).

The SECTOR_AUTHORIZED_T2P combining rule indicates that the traffic to pilot ratio or the power or the rate, which is authorized by a base station sector 120, and a logic included in the rate/power control software module 155 allows the combining rule for Case 2 to be specified at the mobile station 115 using a single algorithm, i.e., without using multiple algorithms for one case having both the scheduled grants and rate control command bits or another case having only rate control command bits. In this manner, this SECTOR_AUTHORIZED_T2P combining rule combines the schedule grants and the rate control commands to arrive at a decision as to what rate or what power to transmit from the mobile station 115.

Using the rate/power control software module 155, the combining rule using logic based on granted rates at each base station sector, called the SECTOR_AUTHORIZED_T2P combining rule, as opposed to the direction of the rate control commands (UP, DOWN, HOLD) may be specified, combining the schedule grants with the rate control commands. For example, in Case 2, the SECTOR_AUTHORIZED_T2P based combining logic for the dedicated rate control protocol with scheduling may be based on following rules: (i) schedule grants may be received only from the serving base station sector and a schedule grant overrides the rate control command from the serving base station sector and (ii) the serving base station sector schedule grant may or may not override the rate control commands from the non-serving base station sectors (grant precedence), i.e., (a) if the GRANT_PRECEDENCE=1, the schedule grant overrides the rate control commands from the non-serving base station sectors and (b) if the GRANT_PRECEDENCE=0, the rate control commands from the non-serving base station sectors override the schedule grant.

By applying this combining rule for the Case 2, the non-serving base station sectors may lower the rate of the mobile station's 115 transmissions after each successful transmission (whether it happens on a first, second or third transmission of the sub-packets corresponding to an encoder packet). Further, all base station sectors may attempt to lower the rate of the mobile station's 115 transmissions whether or not they sent a positive acknowledgement to the mobile station 115. The mobile station 115 pays attention only to the DOWN rate control commands from non-serving base station sectors.

The set of vectors exchanged between the PHY layer 220 and the MAC layer 215 may include a SERVING, SECTOR_AUTHORIZED_T2P, RC_INDICATOR, ACK_INDICATOR as vectors with as many elements as the PDCH active set. The PHY layer 220 shown in FIG. 2 may pass an ACK_INDICATOR and RC_INDICATOR for each base station sector in the active set, and an additional single value T2P(GRANT) if a schedule grant is received, to the MAC layer 215. The MAC layer 215 may implement the combining rule to compute the SECTOR_AUTHORIZED_T2P and hence AUTHORIZED_T2P when predefined conditions are met. The MAC layer 215 may use a knowledge of which base station sector is serving, i.e. the contents of SERVING (SERVING (i)=YES is 'i' is serving, and NO otherwise). For the case, where the ACK is known to be transmitted only from a subset of the active set base station sectors, it is assumed the MAC layer 215 will set the ACK_INDICATOR for all other base station sectors equal to NO (NACK).

Figure 5:
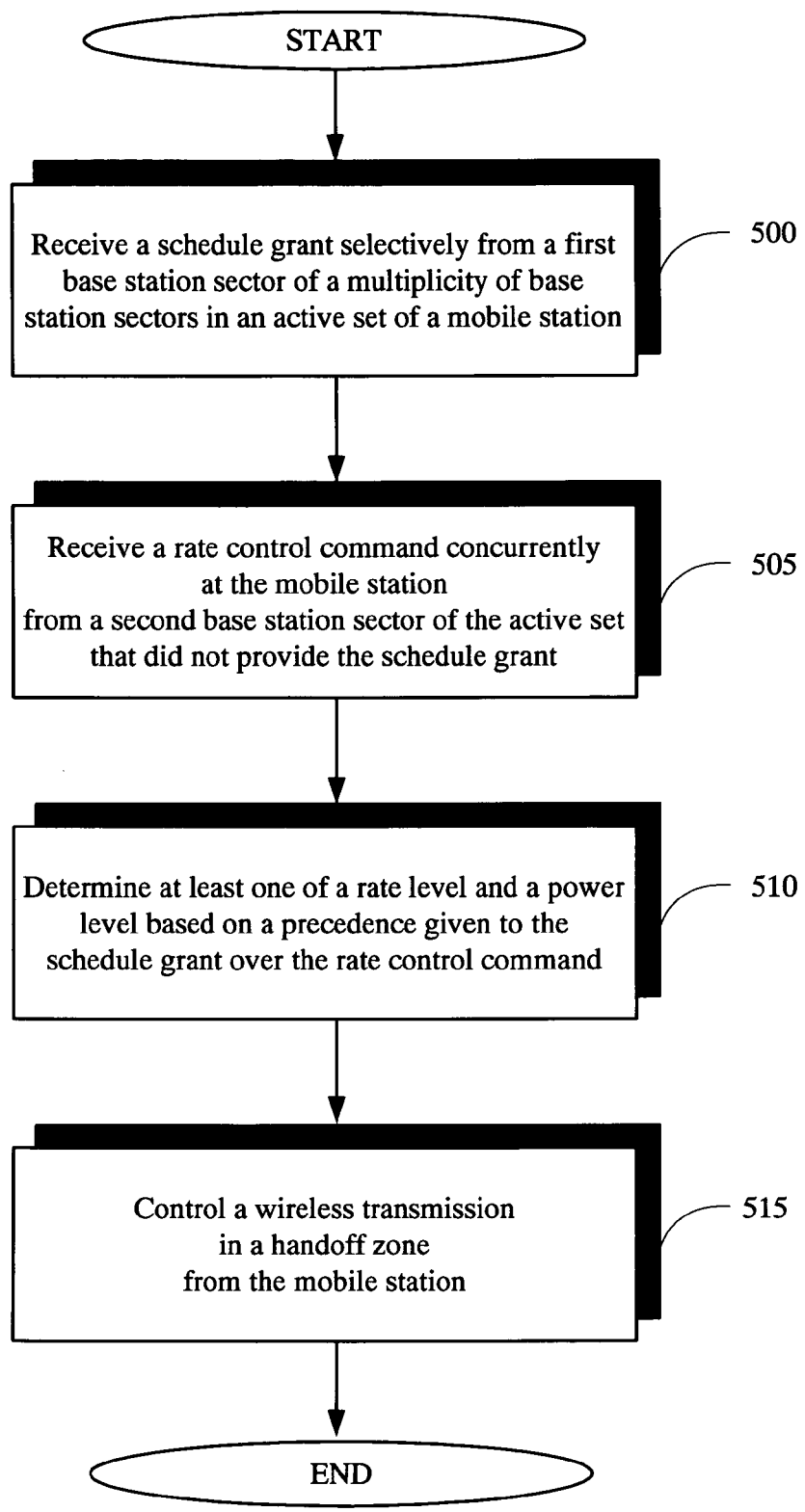
FIG. 5 illustrates a stylized representation of a method for controlling a wireless transmission in a handoff zone according to one illustrative embodiment of the present invention.

Referring to FIG. 5, a stylized representation of a method for controlling a wireless transmission in a handoff zone, such as the handoff zone 410 shown in FIG. 4, is illustrated in accordance with one embodiment of the present invention. At block 500, the mobile station 115 may receive a schedule grant selectively from a first base station sector, e.g., a non-serving base station sector, of the multiplicity of base station sectors 120(1-3) in the active set of the mobile station 115. At block 505, the mobile station 115 may receive a rate control command concurrently at from a second base station sector e.g., a serving or a non-serving base station sector of the multiplicity of base station sectors 120(1-3) from the active set that did not provide the schedule grant.

At block 510, the mobile station 115, using the rate/power control software module 155, shown in FIG. 1, may determine a rate level and/or a power level based on a precedence given to the schedule grant over the rate control command. At block 515, the rate/power control software module 155 may control a wireless transmission on the reverse link 112(2) in a soft handoff zone, i.e., the handoff zone 410 from the mobile station 415.

The basic rate control algorithm used to control a wireless transmission in a handoff zone in blocks 500 through 515 is:

---

EP_SZ is the size of the previously transmitted encoder packet.
RETRANS_LIMIT is the number of retransmissions that were allowed for EP_SZ
DELTA_T2P(EP_SZ,UP/HOLD/DOWN) is the change in T2P at EP_SZ when UP/DOWN/HOLD RC Indicators are received
IF RETRANSMISSION_NUMBER == RETRANS_LIMIT OR ANY(ACK_INDICATOR==YES)
    IF GRANT != NULL % grant is present -continued

```
SECTOR_AUTHORIZED_T2P = T2P(GRANT) % default for all sectors
    SECTOR_AUTHORIZED_T2P(RC_INDICATOR == DOWN AND SERVING
    == NO) = T2P(EP_SZ) +DELTA_T2P(EP_SZ, DOWN)
  ELSE % no grant
    SECTOR_AUTHORIZED_T2P(SERVING==NO) = T2P(EP_SZ) +
    DELTA_T2P(EP_SZ, UP) % default on non-serving sectors
  SECTOR_AUTHORIZED_T2P(RC_INDICATOR == DOWN AND SERVING==NO) =
  T2P(EP_SZ) + DELTA_T2P (EP_SZ,DOWN)
    SECTOR_AUTHORIZED_T2P(SERVING==YES) = T2P(EP_SZ) +
    DELTA_T2P(EP_SZ,RC_INDICATOR(SERVING==YES))
  ENDIF
  IF GRANT != NULL AND GRANT_PRECEDENCE_IND == 1
    AUTHORIZED_T2P = SECTOR_AUTHORIZED_T2P(SERVING==YES)
  ELSE
    AUTHORIZED_T2P = MIN(SECTOR_AUTHORIZED_T2P)
ENDIF
ENDIF
```

Figure 6:
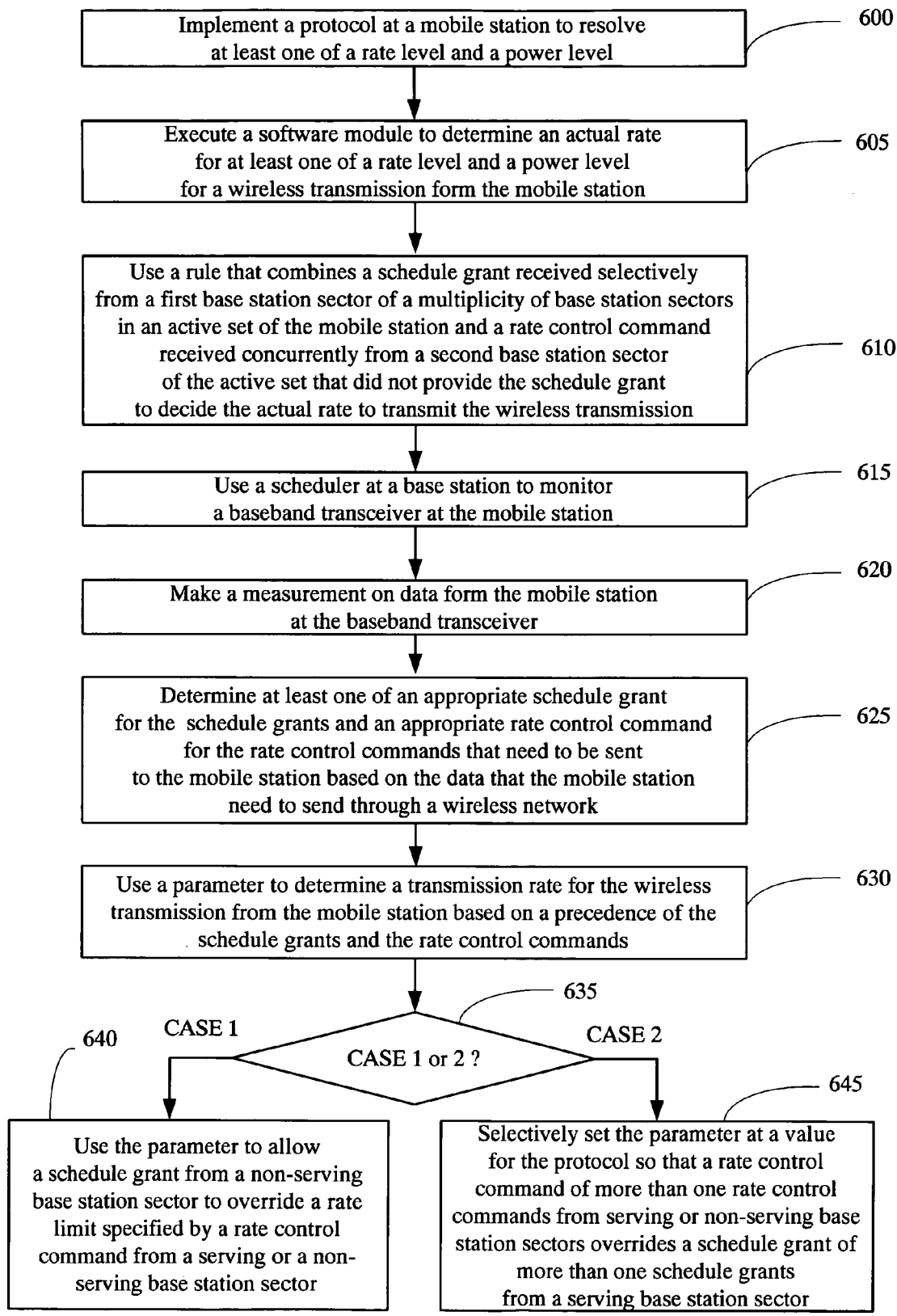
FIG. 6 illustrates a stylized representation of a method that implements a protocol at the mobile station shown in FIG. 1 to resolve at least one of a rate level and a power level based on one or more scheduled clients and one or more rate control commands received from a multiplicity of base station sectors in an active set of the mobile station in accordance with one embodiment of the present invention.

Referring to FIG. 6, a stylized representation of a method that implements a protocol a the mobile station 115 to resolve at least one of a rate level and a power level in a wireless transmission from the mobile station 115 within a soft handoff zone, such as the handoff zone 410, is shown according to one embodiment of the present invention. At block 600, the rate/power control software module 155 may implement a rate control protocol including a common rate control protocol and a dedicated rate control protocol.

The first processor 130(2) may execute, at block 605, the rate/power control software module 155 to determine an actual rate for the rate level or the power level for the wireless transmission from the mobile station 115. The rate/power control software module 155 may use a combining rule that combines one or more schedule grants and one or more rate control commands to decide the actual rate to transmit the wireless transmission at block 610. The base station 125(N) shown in FIG. 1 may use the scheduler software 150 to monitor the baseband transceiver 160 at block 615. The scheduler software 150 may make a measurement on data from the mobile station 115 at the baseband transceiver 160, as indicated in block 620.

The scheduler software 150 may determine an appropriate schedule grant and an appropriate rate control command that need to be sent to the mobile station 115 based on the data that the mobile station 115 needs to send through the wireless network 110, as shown in block 625. The rate/power control software module 155 at the mobile station 115 may use a parameter, i.e., the GRANT_PRECEDENCE parameter to determine a transmission rate for the wireless transmission from the mobile station 115 based on precedence of the schedule grants and the rate control commands received from the multiplicity of the base station sectors in the active set of the mobile station 115, at block 630.

At a decision block 635, based on whether the mobile station 115 in the handoff zone 410 is controlled by a common rate control protocol or a dedicated rate control protocol, the GRANT_PRECEDENCE parameter may be used for either the Case 1 situation or the Case 2 situation, alternatively. If the Case 1 situation is indicated at the decision block 635, i.e., the mobile station 115 is being controlled by a common rate control protocol in the handoff zone 410, at block 640, the GRANT_PRECEDENCE parameter may be used to allow a schedule grant from a non-serving base station sector to override a rate limit specified by a rate control command from a serving or a non-serving base station sector, of the active set of the mobile station 115, that did not provide the schedule grant. Conversely, if the Case 2 situation of more than one rate control commands with more than one schedule grants is indicated for a dedicated rate control protocol at the decision block 635, at block 645, a value for the GRANT_PRECEDENCE parameter may be selectively set for the dedicated rate control protocol being implemented by the rate/power control software module 155 so that a rate control command from a non-serving base station sector overrides a schedule grant from a serving base station sector, allowing the non-serving base station sectors to control a level of load from multiple users. That is, the mobile station 115 selectively obeys the rate control command from the non-serving base station sector.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for controlling a wireless transmission in a handoff zone, the method comprising:
    receiving a schedule grant selectively from a first base station sector of a multiplicity of base station sectors in an active set of a mobile station; and
    receiving a rate control command concurrently at said mobile station from a second base station sector of said active set that did not provide said schedule grant; and
    determining at least one of a rate level and a power level based on a precedence, the precedence being given to said schedule grant over said rate control command in a dedicated rate control mode and the precedence being given to said rate control command over said schedule grant in a common rate control mode.

2. A method, as set forth in claim 1, further comprising:
    causing said mobile station to ignore said rate control command from a serving base station sector of said multiplicity of base station sectors when it receives said schedule grant from that sector.

3. A method, as set forth in claim 1, further comprising:
    receiving said schedule grant from a non-serving base station sector of said multiplicity of base station sectors; and applying said precedence on said schedule grant from said non-serving base station sector.

4. A method, as set forth in claim 1, wherein determining at least one of a rate level and a power level further comprising:
    implementing a protocol at said mobile station to resolve said at least one of a rate level and a power level;
    executing a software module to determine an actual rate for said at least one of a rate level and a power level for said wireless transmission from said mobile station; and
    using a rule that combines said schedule grant and said rate control command to decide the actual rate to transmit said wireless transmission.

5. A method, as set forth in claim 1, further comprising:
    providing a scheduler at a base station for monitoring a base station receiver;
    making a measurement on data from said mobile station at said base station receiver; and determining at least one of an appropriate schedule grant for one or more schedule grants and an appropriate rate control command for one or more rate control commands that need to be sent to said mobile station based on the data that said mobile station need to send through a wireless network.

6. A method, as set forth in claim 5, further comprising:
    using a parameter to determine a transmission rate for said wireless transmission from said mobile station based on a precedence of said one or more schedule grants and said one or more rate control commands; and
    specifying the parameter such that to allow said mobile station to override an outcome of a rate control algorithm that indicates a schedule grant from a serving base station sector to change the transmission rate.

7. A method, as set forth in claim 6, further comprising:
    providing an ability to set a value for the parameter so that either it has precedence or it doesn't; and
    using the parameter to allow the schedule grant from the serving base station sector to override a rate limit specified by a rate control command from a non-serving base station sector in the dedicated rate control mode.

8. A method, as set forth in claim 1, further comprising:
    selectively setting a parameter at a value for a protocol so that a rate control command from a non-serving base station sector overrides a schedule grant from a serving base station sector in the common rate control mode; and
    causing said mobile station to selectively obey the rate control command from the non-serving base station sector based on said value of the parameter, wherein said handoff zone is a soft handoff zone being a region between said multiplicity of base station sectors where said mobile station receives control information from each of said multiplicity of base station sectors and data transmissions from said mobile station is received by said multiplicity of base station sectors.

9. A method, as set forth in claim 1, further comprising:
    setting a grant precedence parameter to transfer data rate allocations between at least two users in a soft handoff zone; and
    in response to said rate control command to all mobile stations including said mobile station from a base station sector of said multiplicity of base station sectors, transferring a traffic load from one user of said at least two users in the soft handoff zone to another user of at least two users based on said grant precedence parameter.

10. A method, as set forth in claim 1, further comprising:
    setting a grant precedence parameter to allow one or more non-sewing base station sectors of said multiplicity of base station sectors to control a level of a traffic load from one or more users in a soft handoff zone in the common rate control mode; and
    in response to said rate control command to each mobile station including said mobile station of all mobile stations from a base station sector of said multiplicity of base station sectors, assigning a higher data rate to said one or more users in the soft handoff zone than other users based on said grant precedence parameter.

11. A mobile station, comprising:
    a processor; and
    a memory coupled to said processor, said memory storing instructions to control a wireless transmission in a handoff zone based on a schedule grant received selectively from a first base station sector of a multiplicity of base station sectors in an active set of said mobile station and a rate control command received concurrently with the schedule grant at said mobile station from a second base station sector of said active set that did not provide said schedule grant, the memory further storing instructions to determine at least one of a rate level and a power level based on a precedence given to said schedule grant over said rate control command, the precedence being given to said schedule grant over said rate control command in a dedicated rate control mode and the precedence being given to said rate control command over said schedule grant in a common rate control mode.

12. A mobile station, as set forth in claim 11, further comprising:
    a software module that implements a protocol to resolve at least one of a rate level and a power level based on said one or more schedule grants and said one or more rate control commands, wherein said handoff zone is a soft handoff zone being a region between said multiplicity of base station sectors where said mobile station receives control information from each of said multiplicity of base station sectors and data transmissions from said mobile station is received by said multiplicity of base station sectors.

13. A mobile station, as set forth in claim 12, further comprising:
a baseband transceiver to receive concurrently said schedule grant and said rate control command from said multiplicity of base station sectors in said active set of said mobile station.

14. A mobile station, as set forth in claim 13, wherein said software module to use a rule that combines said schedule grant and said rate control command to decide an actual rate to transmit said wireless transmission.

15. A mobile station, as set forth in claim 14, wherein said software module to use a parameter to determine a transmission rate for said wireless transmission from said mobile station based on a precedence of said schedule grant and said rate control command, and said mobile station and said multiplicity of base station sectors are defined at least in part by a code division multiple access protocol.

16. A base station, comprising:
a multiplicity of base station sectors;
a first processor coupled to said multiplicity of base station sectors; and
a first memory coupled to said first processor, said first memory storing instructions to generate a schedule grant selectively from a first base station sector of said multiplicity of base station sectors in an active set of a mobile station and generate a rate control command concurrently at said mobile station from a second base station sector of said active set that did not provide said schedule grant to control a wireless transmission in a handoff zone from said mobile station based on a precedence given to said schedule grant over said rate control command, the precedence being given to said schedule grant over said rate control command in a dedicated rate control mode and the precedence being given to said rate control command over said schedule grant in a common rate control mode.

17. A base station, as set forth in claim 16, further comprising:
a base station receiver; and
a scheduler for monitoring said base station receiver, wherein said scheduler to make a measurement on data form a mobile station at said base station receiver.

18. A base station, as set forth in claim 17, wherein said scheduler to determine at least one of an appropriate schedule grant from one or more schedule grants and an appropriate rate control command from one or more rate control commands that need to be sent to said mobile station based on the data that said mobile station need to send through a wireless network.

19. A base station, as set forth in claim 18, wherein said handoff zone is a soft handoff zone being a region between said multiplicity of base station sectors where said mobile station receives control information from each of said multiplicity of base station sectors and data transmissions from said mobile station is received by said multiplicity of base station sectors.

20. A base station, as set forth in claim 19, wherein said mobile station and said base station are defined at least in part by a code division multiple access protocol.

21. A telecommunication system, comprising:
a base station associated with a wireless network, said base station to communicate with a mobile station over a wireless medium across a multiplicity of base station sectors, said base station including:
a first processor, and
a first memory coupled to said first processor, said first memory storing instructions to generate a schedule grant selectively from a first base station sector of said multiplicity of base station sectors in an active set of a mobile station and generate a rate control command concurrently with said schedule grant at said mobile station from a second base station sector of said active set that did not provide said schedule grant to control a wireless transmission in a handoff zone from said mobile station based on based on a precedence, the precedence being given to said schedule grant over said rate control command in a dedicated rate control mode and the precedence being given to said rate control command over said schedule grant in a common rate control mode.

22. A telecommunication system, as set forth in claim 21, further comprising a mobile station, including:
a second processor, and
a second memory coupled to said second processor, said second memory storing instructions to resolve at least one of a rate level and a power level based on said schedule grant and said rate control command from said multiplicity of base station sectors.

23. A telecommunication system, as set forth in claim 22, wherein said mobile station and said base station are defined at least in part by a code division multiple access protocol.

24. An apparatus for controlling a wireless transmission in a handoff zone, the apparatus comprising:
means for receiving a schedule grant selectively from a first base station sector of a multiplicity of base station sectors in an active set of a mobile station; and
means for receiving a rate control command concurrently at said mobile station from a second base station sector of said active set that did not provide said schedule grant; and
means for determining at least one of a rate level and a power level based on a precedence, the precedence being given to said schedule grant over said rate control command in a dedicated rate control mode and the precedence being given to said rate control command over said schedule grant in a common rate control mode.

25. An apparatus, as set forth in claim 24, further comprising:
means for implementing a protocol at said mobile station to resolve said at least one of a rate level and a power level;
means for executing a software module to determine an actual rate for said at least one of a rate level and a power level for said wireless transmission from said mobile station; and
means for using a rule that combines said schedule grant and said rate control command to decide the actual rate to transmit said wireless transmission.

26. An article comprising a computer readable storage medium storing instructions that, when executed cause a processor-based system to:
receive a schedule grant selectively from a first base station sector of a multiplicity of base station sectors in an active set of a mobile station; and
receive a rate control command concurrently at said mobile station from a second base station sector of said active set that did not provide said schedule grant; and
determine at least one of a rate level and a power level based on a precedence, the precedence being given to said schedule grant over said rate control command to control a wireless transmission in a handoff zone in a dedicated rate control mode and the precedence being given to said rate control command over said schedule grant in a common rate control mode.

27. An article, as set forth in claim 26, comprising a medium storing instructions that, when executed cause a processor-based system to:
   implement a protocol at said mobile station to resolve said at least one of a rate level and a power level;
   execute a software module to determine an actual rate for said at least one of a rate level and a power level for said wireless transmission from said mobile station; and
   use a rule that combines said schedule grant and said rate control command to decide the actual rate to transmit said wireless transmission.

28. An article, as set forth in claim 26, comprising a medium storing instructions that, when executed cause a processor-based system to:
   cause said mobile station to ignore said rate control command from a serving base station sector of said multiplicity of base station sectors when it receives said schedule grant from that sector.

29. An article, as set forth in claim 26, comprising a medium storing instructions that, when executed cause a processor-based system to:
   receive said schedule grant from a non-serving base station sector of said multiplicity of base station sectors; and
   apply said precedence on said schedule grant from said non-serving base station sector.

30. An article, as set forth in claim 26, comprising a medium storing instructions that, when executed cause a processor-based system to:
   provide a scheduler at a base station for monitoring a base station receiver;
   make a measurement on data from said mobile station at said base station receiver;
   determine at least one of an appropriate schedule grant for one or more schedule grants and an appropriate rate control command for one or more rate control commands that need to be sent to said mobile station based on the data that said mobile station need to send through a wireless network;
   use a parameter to determine a transmission rate for said wireless transmission from said mobile station based on a precedence of said one or more schedule grants and said one or more rate control commands;
   specify the parameter such that to allow said mobile station to override an outcome of a rate control algorithm that indicates a schedule grant from a serving base station sector to change the transmission rate;
   provide an ability to set a value for the parameter so that either it has precedence or it doesn't; and
   use the parameter to allow the schedule grant from the serving base station sector to override a rate limit specified by a rate control command from a non-serving base station sector.

* * * * *